United States Patent
Wang

[11] Patent Number: 5,318,344
[45] Date of Patent: Jun. 7, 1994

[54] DETACHABLE BIKE SEAT JACKET

[76] Inventor: Sui-Mu Wang, c/o Hung Hsing Patent Service Center, P.O. Box 55-1670, Taipei (10477), Taiwan

[21] Appl. No.: 981,317

[22] Filed: Nov. 25, 1992

[51] Int. Cl.$^5$ ............................................. B62J 1/16
[52] U.S. Cl. ................................. 297/199; 297/214; 5/454
[58] Field of Search .................. 5/454; 297/195, 199, 297/200, 214, 224

[56] References Cited

U.S. PATENT DOCUMENTS

| | | | |
|---|---|---|---|
| 3,997,214 | 12/1976 | Jacobs | 297/214 |
| 4,319,781 | 3/1982 | Tsuge | 297/214 |
| 4,504,089 | 3/1985 | Calvert et al. | 297/200 X |
| 4,786,104 | 11/1988 | Fellenbaum | 297/195 X |
| 4,952,439 | 8/1990 | Hanson | 297/214 X |
| 5,046,205 | 9/1991 | Garcia | 5/454 X |

FOREIGN PATENT DOCUMENTS 1146460  5/1983  Canada ............................... 297/200

Primary Examiner—Michael F. Trettel

[57] ABSTRACT

A detachable jacket for a bike seat includes: a jacket having an upper cushioning portion formed with a plurality of cells filled with pressurized fluid in the cells for a comfortable cushioning purpose for a bike driver sitting on the bike seat, and a lower skirt portion connected with the upper cushioning portion and protruding downwardly from the upper cushioning portion for telescopically retaining the jacket on the bike seat, whereby upon releasing of the jacket from the bike seat, the jacket can be repeatedly washed or conveniently maintained.

1 Claim, 3 Drawing Sheets

DETACHABLE BIKE SEAT JACKET

BACKGROUND OF THE INVENTION

A conventional bike seat is formed by adhering or coating an elastomer, sponge or foam layer on a seat positioned at an upper end of a bike seat tube and then further fixing a protective cover such as plastic sheet, leather or cloth on the seat coated with elastomer or foam layer for cushioning purposes.

However, such a conventional bike seat has the following drawbacks:

1. The cover is fixedly secured on the seat, which can not be replaced with a new cover and can not be removed for washing.

2. Once the elastomer or foam layer is damaged, it is difficult to repair the damaged seat, which should be disposed and replaced with a complete new seat, thereby wasting money.

SUMMARY OF THE INVENTION

The object of the present invention is to provide a detachable jacket for a bike seat including: a jacket having an upper cushioning portion formed with a plurality of cells filled with pressurized fluid in the cells for a comfortable cushioning purpose for a bike driver sitting on the bike seat, and a lower skirt portion connected with the upper cushioning portion and protruding downwardly from the upper cushioning portion for telescopically retained the jacket on the bike seat, whereby upon releasing of the jacket from the bike seat, the jacket can be repeatedly washed or conveniently maintained.

DETAILED DESCRIPTION

Figure 1:
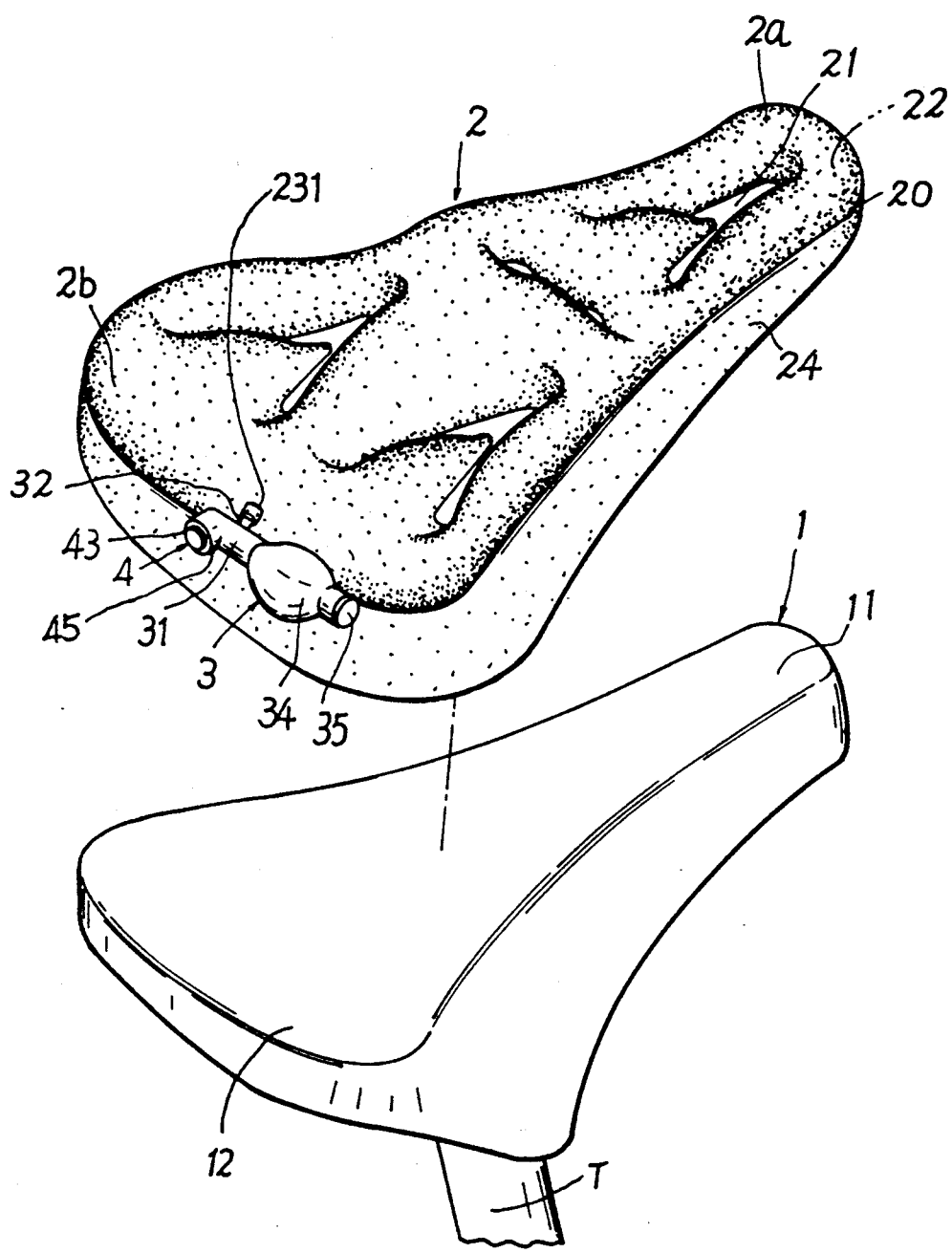
FIG. 1 is an illustration showing a jacket to be retained on a bike seat in accordance with the present invention.
Figure 2:
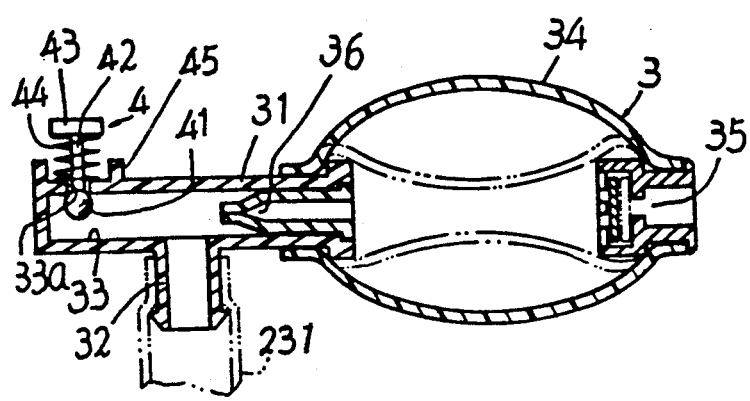
FIG. 2 shows a pumping means and a releasing valve of the present invention.
Figure 3:
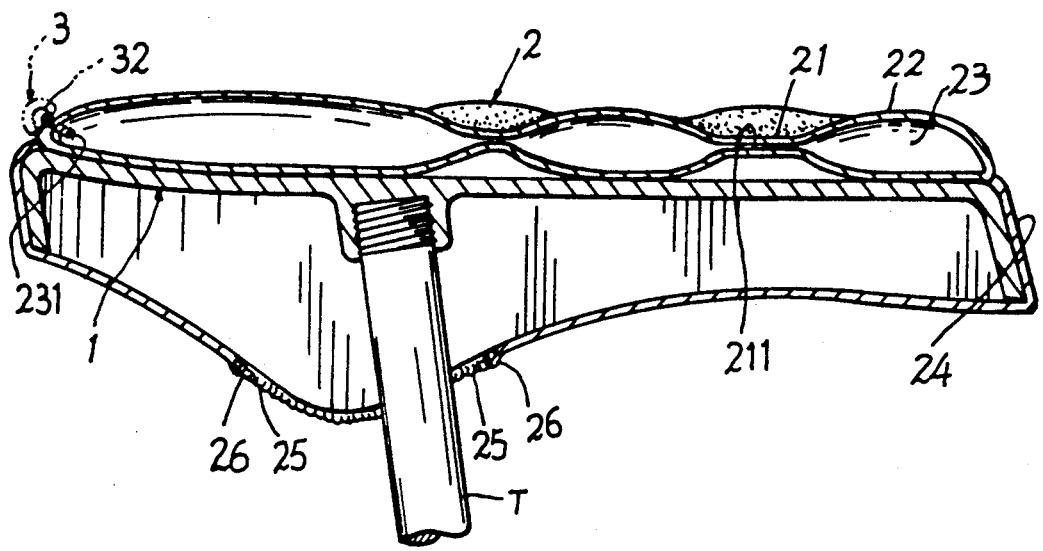
FIG. 3 is a sectional drawing of the present invention.
Figure 4:
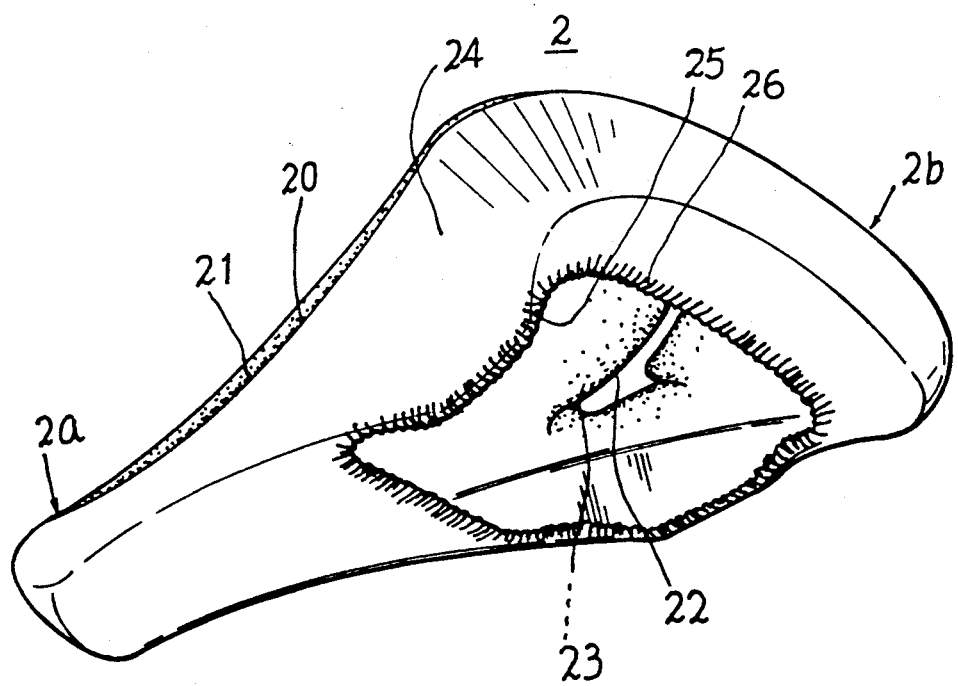
FIG. 4 is a perspective view of the jacket as viewed from a bottom portion of the jacket.

The present invention comprises: a jacket 2 detachably retained on a bike seat 1 which is secured on a seat tube T of a bicycle, having a pumping means 3 and a releasing valve 4 provided on the jacket 2.

The jacket 2 includes: an upper cushioning portion 21 having a plurality of cells 22 filled with pressurized fluid 23 in the cells 22 for cushioning use, and a lower skirt portion 24 secured to the upper cushioning portion 21 at a boundary line 20 and protruding downwardly from the upper cushioning portion to convergently form a collar opening 25 confined by an elasticized corrugated collar 26 disposed around the collar opening 25, with the elasticized corrugated collar 26 being expansively detachably released from the bike seat 1 and retractively fastened on the bike seat.

The cells may be filled with pressurized fluid 23 which is pumped by a pumping means 3 and the pressurized fluid in the cells 22 may be released from the cells by a releasing valve 4.

The pumping means 3 includes: a delivery hose 31 having a fluid tube 32 connected with a fluid adapter 231 communicating with the cells 22 of the upper cushioning portion 21, and a bellows 34 normally expandible for sucking fluid thereinto from an outside fluid supply source and operatively depressible for squeezing fluid into the delivery hose 31 having an inlet check valve 35 formed on an fluid suction port of the bellows 34 and a supply check valve 36 provided in a fluid supply port communicating the delivery hose 31, thereby allowing a single-way inlet suction of fluid from an opened inlet check valve 35 in to the bellows 34 when operatively expanding the bellows 34 for opening the inlet check valve 35 and closing the supply check valve 36; and a single-way fluid supply of fluid compressed into the fluid tube 32 and the cells 22 communicating with the fluid tube 32 by opening the supply check valve 36 and closing the inlet check valve 35 when compressing the bellows 34 for inflatably filling the cells 22.

The releasing valve 4 includes: a plug 41 secured with a stem 42 resiliently held in a cylinder portion 45 formed on a hose portion 33 of the delivery hose 31 of the pumping means 3 with the hose portion 33 communicating with the cells 22 of the cushioning portion 21 and with the plug 41 normally sealing a discharge port 33a formed in the hose portion 33 of the delivery hose 31, a button 43 formed on an outer end portion of the stem 42 adapted to be depressed by a user for opening the releasing valve 4 for releasing fluid outwardly from the cells 22 of the cushioning portion 21 and a restoring spring 44 resiliently retaining the button 43 outwardly from the cylinder portion 45 for normally pulling the plug 41 for sealing the discharge port 33a of the delivery hose 31.

The jacket 2 is generally formed as a triangular shape having a front tapered portion 2a and a rear enlarged portion 2b to be snugly engageable with the bike seat or seat frame 1 also generally triangular shaped having a front tapered seat portion 11 and a rear wide seat portion 12.

The collar opening 25 is smaller than the rear enlarged seat portion 12 for a firm fastening of the jacket 2 on the seat 1 due to an elastic tension as caused by the elasticized corrugated collar 26 of the jacket 2.

The pressurized fluid 23 filled in the cells 22 of the upper cushioning portion 21 may also be selected from water and other liquids or water mixed with fine cork powder. The cork powder mixed in the water may increase the viscosity of the fluid 23 for enhancing a stable cushioning effect of the present invention. The fluid 23 of liquid may be directly boosted into the cells 22 by an external liquid pumping system, rather than the pumping means 3 as aforementioned.

The cells 22 are inter-connectable and communicated with one another by an aperture 211 formed in the upper cushioning portion 21 communicating between every two neighbouring cells 22 of the cushioning portion 21 for filling fluid 23 in the cells 22.

The shapes, structure and arrangement of the cells 22 of the jacket 2, and the fluids 23 filled in the cells 22 are not limited in this invention.

The present invention is superior to a conventional bike seat with the following advantages:

1. The jacket 2 can be detachably released from the bike seat 1 for convenient repeated maintenance services.

2. The fluid pressure in the cells 22 can be adjusted for a comfortable cushioning purpose when sitting on the bike seat.

I claim:

1. A jacket for a bike seat comprising:

a jacket having a collar opening formed on a bottom portion of the jacket for detachably releasing said jacket from said bike seat and telescopically fastening said jacket on said bike seat;

said jacket including: an upper cushioning portion having a plurality of cells filled with a pressurized fluid in the cells by a pumping means, and a lower skirt portion secured to the upper cushioning portion and protruding downwardly from the upper cushioning portion to convergently form said collar opening confined by an elasticized corrugated collar disposed around the collar opening, with the elasticized corrugated collar being expansively detachably released on the bike seat and retractively fastened on the bike seat, said pressurized fluid in said cells operatively released by a releasing valve;

said pumping means including: a delivery hose having a fluid tube connected with a fluid adapter communicating with the cells of the upper cushioning portion, and a bellows normally expandible for sucking fluid thereinto from an outside fluid supply source and operatively depressible for squeezing fluid into the delivery hose, said bellows having an inlet check valve formed on a fluid suction port of the bellows and a supply check valve provided in a fluid supply port communicating with the delivery hose, thereby allowing a single-way inlet suction of fluid through said inlet check valve into the bellows when operatively expanding the bellows and closing the supply check valve; and a single-way supply of fluid into the fluid tube and the cells communicating with the fluid tube by opening the supply check valve and closing the inlet check valve for inflatably filling the cells; and said releasing valve including: a plug secured with a stem resiliently held in a cylinder portion formed on a hose portion of the delivery hose of the pumping means with the hose portion communicating with the cells of the cushioning portion and normally sealing a discharge port formed in the hose portion of the delivery hose, a button formed on an outer end portion of the stem adapted to be depressed by a user for opening the releasing valve for releasing fluid from the cells of the cushioning portion and a restoring spring resiliently biasing the button outwardly from the cylinder portion for normally pulling the plug for sealing the discharge port of the delivery hose.

* * * * *